(12) United States Patent
Gater (10) Patent No.: US 7,315,585 B2
(45) Date of Patent: Jan. 1, 2008

(54) CLOCK-LESS SERIAL DATA INTERFACE USING A SINGLE PIN

(75) Inventor: Christian Gater, Dunblane (GB)

(73) Assignee: Micrel, Inc., San Jose, CA (US)

( * ) Notice: Subject to any disclaimer, the term of this patent is extended or adjusted under 35 U.S.C. 154(b) by 751 days.

(21) Appl. No.: 10/776,154

(22) Filed: Feb. 11, 2004

(65) Prior Publication Data

US 2005/0175120 A1    Aug. 11, 2005

(51) Int. Cl.
*H04L 27/00*    (2006.01)
(52) U.S. Cl. .................. 375/316; 375/22.1; 375/242; 375/256; 375/257; 375/259; 365/201; 365/185.18; 324/73; 371/15.1; 371/22.1; 323/283
(58) Field of Classification Search ............. 375/316, 375/22.1, 259, 256, 257, 136, 239, 327, 242; 365/201, 185.18; 371/15.1, 22.1; 323/283; 324/73
See application file for complete search history.

(56) References Cited

U.S. PATENT DOCUMENTS

| | | | |
|---|---|---|---|
| 4,841,233 A | 6/1989 | Yoshida | |
| 5,077,738 A * | 12/1991 | Larsen et al. | 714/42 |
| 5,161,159 A * | 11/1992 | McClure et al. | 714/724 |
| 5,384,741 A * | 1/1995 | Haraguchi et al. | 365/201 |
| 5,412,644 A | 5/1995 | Herberle | |
| 5,668,716 A | 9/1997 | Otomo | |
| 5,826,068 A | 10/1998 | Gates | |
| 5,864,872 A | 1/1999 | Lee et al. | |
| 6,057,675 A * | 5/2000 | Tateishi | 323/283 |
| 6,400,605 B1 | 6/2002 | Adkins | |

* cited by examiner

*Primary Examiner*—Shuwang Liu
*Assistant Examiner*—Helene Tayong
(74) *Attorney, Agent, or Firm*—Patent Law Group LLP; Carmen C. Cook (57) ABSTRACT

A data communication method for receiving digital data on a data terminal includes receiving data pulses having a first pulse separation to represent a first logical data value and a second pulse separation to represent a second logical data value, generating a voltage ramp signal, resetting the voltage ramp signal at a first delay after the leading edge of each data pulse, regenerating the voltage ramp signal at a first time period after the resetting of the voltage ramp signal, detecting the voltage value of the voltage ramp signal at the leading edge of each data pulse, and generating a data output signal associated with each data pulse. The data output signal has a first logical state when the voltage value of the voltage ramp signal is less than a threshold value and a second logical state when the voltage value of the voltage ramp signal is greater than the threshold value.

41 Claims, 4 Drawing Sheets

CLOCK-LESS SERIAL DATA INTERFACE USING A SINGLE PIN

FIELD OF THE INVENTION

The invention relates to a single-pin serial data communication interface and, in particular, to a single-pin serial data communication interface for embedded memory programming without using internal clock signals for synchronization.

DESCRIPTION OF THE RELATED ART

As the number of functions designed into an integrated circuit (IC) increases, the number of input-output pins (I/O pins) of the integrated circuit also increases correspondingly. However, it is often not desirable or feasible to increase the pin count of an integrated circuit. The pin count of an integrated circuit is often limited by the size and design of IC packages in which the integrated circuit is assembled. A large pin count increases the complexity and the cost for packaging the integrated circuit. Therefore, there is often a limit on the amount of I/O pins an integrated circuit can have.

In some integrated circuits, a serial data port is provided for loading data into the integrated circuits. A serial data interface, or serial interface, describes a data channel that transfers digital data in a serial fashion: one bit after the other over one or more wires. The serial interface is often used to load data into an integrated circuit to program the integrated circuit or to select desired operating characteristics for the integrated circuit. While a serial interface may use only one wire for data transfer, the serial interface often include multiple lines for transmitting commands or synchronization signals. Thus, implementing a serial data port in an integrated circuit can require multiple I/O pins.

A single pin serial port is described in U.S. Pat. No. 5,826,068 to Stillman F. Gates (the '068 patent). The '068 patent describes a serial port that uses a single bidirectional pin for transfer of information to and from a circuit. The single pin serial port uses a packet transmission scheme where information to be transferred, including commands, acknowledgements and data, are packaged into packets for transmission on the single wire. The single pin serial port of the '068 patent requires clock synchronization between the transmitter and the receiver or appropriate bus termination of the single wire must be provided.

Other methods for implementing a serial port on a single pin have also been described. U.S. Pat. No. 5,412,644 to Herberle describes a method and circuit arrangement for a single-wire bus system where data to be transmitted is encoded as a number N which is transmitted as a pulse sequence. When idle, the transmitter locks the single wire to one state. When encoded data is to be transmitted, the transmitter unlocks the single wire and the wire is pulled to a second state, such as by an external pull-up device. The processor receiving the encoded data senses the transition on the single wire and forces the single wire back to the first state. This operation successively forms the desired pulse sequence. The transmitter counts the number of ones on the single wire and when the desired number N is reached, the transmitter locks the single wire again. The serial interface method described in the '644 patent requires pull-up or pull-down devices on the single wire and counting of the number of ones on the single wire to determine the transferred data.

U.S. Pat. No. 5,864,872 to Lee describes a host system pulling up (precharing) the data line and then pulling down to indicate data transfer. The host system always uses a falling edge to indicate the start of the next bit to be written, then waits, then drive the line high or low depending on the data value. The method described in the '872 patent relies on clock synchronization to transmit data.

U.S. Pat. No. 5,668,716 to Otomo describes a single wire serial interface using a two-way conversion adapter. Basically, the conversion adapter is switchably connected to the transmit and receipt terminals of an I/O device to convert the two input/output lines to a single wire serial interface.

It is desirable to provide a serial data interface that does not require passive pull-up or pull-down functions or synchronous operation.

SUMMARY OF THE INVENTION

According to one embodiment of the present invention, a data communication method for receiving digital data on a data terminal includes: receiving data pulses indicative of the digital data to be transmitted at the data terminal where the data pulses have a first pulse separation to represent a first logical data value and a second pulse separation to represent a second logical data value, generating a voltage ramp signal having a voltage magnitude between a first voltage and a second voltage, resetting the voltage ramp signal to the first voltage a first delay after the leading edge of each data pulse, regenerating the voltage ramp signal towards the second voltage a first time period after the resetting of the voltage ramp signal, detecting the voltage value of the voltage ramp signal at the leading edge of each data pulse, generating a data output signal associated with each data pulse having a first logical state when the voltage value of the voltage ramp signal is less than a threshold value, generating a data output signal associated with each data pulse having a second logical state when the voltage value of the voltage ramp signal is greater than the threshold value, and storing the data output signal associated with each data pulse in a shift register.

According to another aspect of the present invention, an integrated circuit includes a data terminal where the data terminal is to be coupled to a single data wire for receiving digital data transmitted on the single data wire and a serial data interface circuit. The serial data interface circuit includes a first terminal coupled to the data terminal for receiving the digital data where the digital data is encoded as data pulses having a first pulse separation to represent a first logical data value and a second pulse separation to represent a second logical data value. The serial data interface-circuit also includes a delay circuit including an input terminal coupled to the data terminal for receiving the data pulses and an output terminal providing an output signal. The delay circuit introduces a first delay to at least the leading edge of each data pulse and provides delayed data pulses as the output signal at the output terminal. The serial data interface circuit further includes a ramp signal circuit including a control input terminal coupled to receive the output signal of the delay circuit and an output terminal providing a voltage ramp signal having a voltage magnitude between a first voltage and a second voltage. The voltage ramp signal is reset to the first voltage at the leading edge of each delayed data pulse and is regenerated towards the second voltage at a first time period after the leading edge of each delayed data pulse. Lastly, the serial data interface circuit includes an N-bit shift register having a clock input terminal coupled to the first terminal receiving the data pulses, a data input terminal coupled to the output terminal of the ramp signal circuit for receiving the voltage ramp signal and an N-bit data output terminal providing the N-bit digital data stored therein in parallel data bits.

In operation, for each data pulse, the shift register stores a data signal indicative of the magnitude of the voltage ramp signal at the leading edge of each data pulse. The data signal has a first logical state when the voltage value of the voltage ramp signal is less than a threshold value and the data signal has a second logical state when the voltage value of the voltage ramp signal is greater than the threshold value.

The present invention is better understood upon consideration of the detailed description below and the accompanying drawings.

BRIEF DESCRIPTION OF THE DRAWINGS

FIG. 2, which includes

DETAILED DESCRIPTION OF THE PREFERRED EMBODIMENTS

In accordance with the principles of the present invention, a single pin serial data interface employs pulse position coding to encode digital data to be transferred over a single wire and a ramp signal whose magnitude is indicative of the pulse positioning to decode the digital data received on the single wire. In one embodiment, digital data to be transferred on the single wire is encoded as data pulses having a short pulse separation to represent a first logical state, such as the logical "low" state, and a long pulse separation to represent a second logical state, such as the logical "high" state. The single pin serial data interface decodes the incoming data pulses using a ramp signal whose magnitude is determined by the amount of pulse separations. By comparing the magnitude of the ramp signal to an appropriate threshold level, the magnitude of the ramp signal associated with each data pulse can be used to recover the digital data value encoded in the data pulses. The single pin serial data interface of the present invention can be implemented in an integrated circuit using a dedicated pin or a multi-function pin. In one application, the serial data interface of the present invention can be used for communications between a host controller and a slave integrated circuit (IC) for the purpose of securely programming the slave without the need for dedicated serial interface pins or internal clock sources for synchronization.

In one embodiment, the data pulses can be transmitted with a latching pulse for causing the transmitted data to be latched into a memory in the integrated circuit. Using a latching pulse can prevent inadvertent programming of the data content of the memory in the integrated circuit. In one embodiment, a latch signal is implemented by appending to the last data pulse a latching pulse having a voltage magnitude exceeding the normal operating range of the pin of the integrated circuit. To further prevent false programming of the memory of the integrated circuit, a special program code can be used whereby the serial data received on the serial data interface will only be latched into the memory of the integrated circuit when the serial data contains the special program code.

The single pin serial data interface of the present invention can be implemented on a dedicated pin or a multi-function pin of the integrated circuit. In the present description, a multi-function pin refers to an input/output (I/O) pin of an integrated circuit for supporting two or more functions on the integrated circuit. In most integrated circuits, pin count is limited and implementing the serial data interface on a multi-function pin is desirable as the same pin can be used for other purposes when serial data programming is not performed. More specifically, an I/O pin of an integrated circuit can have an application specific function in a normal mode where data received on or transmitted onto the I/O pin supports the application specific function. However, the same I/O pin of the integrated circuit can be put in a serial programming mode where the I/O pin is used to load serial data into a memory of the integrated circuit through the serial data interface circuit of the present invention. The same I/O pin can also be used to indicate latching of the serial data by receiving a latching pulse having a voltage magnitude that is outside of the normal operating voltage range of the I/O pin.

The single pin serial data interface of the present invention provides many advantages over conventional single pin serial port solutions.

First, because the digital data to be transmitted is encoded by relative pulse positions, no clock synchronization or critical timing requirement is required. Thus, the implementation of the serial data interface of the present invention is simplified and the cost of incorporating the serial data interface in an integrated circuit is minimized.

Second, a single pin or a single wire is used to implement the serial data interface. The single pin does not have to be a dedicated pin and data loading and/or latching can be performed on the same pin. Thus, the serial data interface of the present invention can be applied where pin count is limited and no additional I/O pin can be dedicated for use just for serial data programming.

Third, the serial data interface provides a secure latching scheme in that latching of the serially loaded data is prevented unless the serial data pin is taken beyond its normal operating range. When the serial data pin is a multi-function pin, the pin is unlikely to be taken beyond its normal operating range in normal operation. Thus, the serial data interface prevents latching of digital data on the multi-function pin that are not intended for the serial data interface circuit. In an alternate embodiment, enhanced latching security is provided by requiring the loading of a special latching code via the serial data pin. Thus, a latching pulse beyond the normal operating range of the pin and a special latching code are both required before latching of the serially loaded data can occur.

Figure 1:
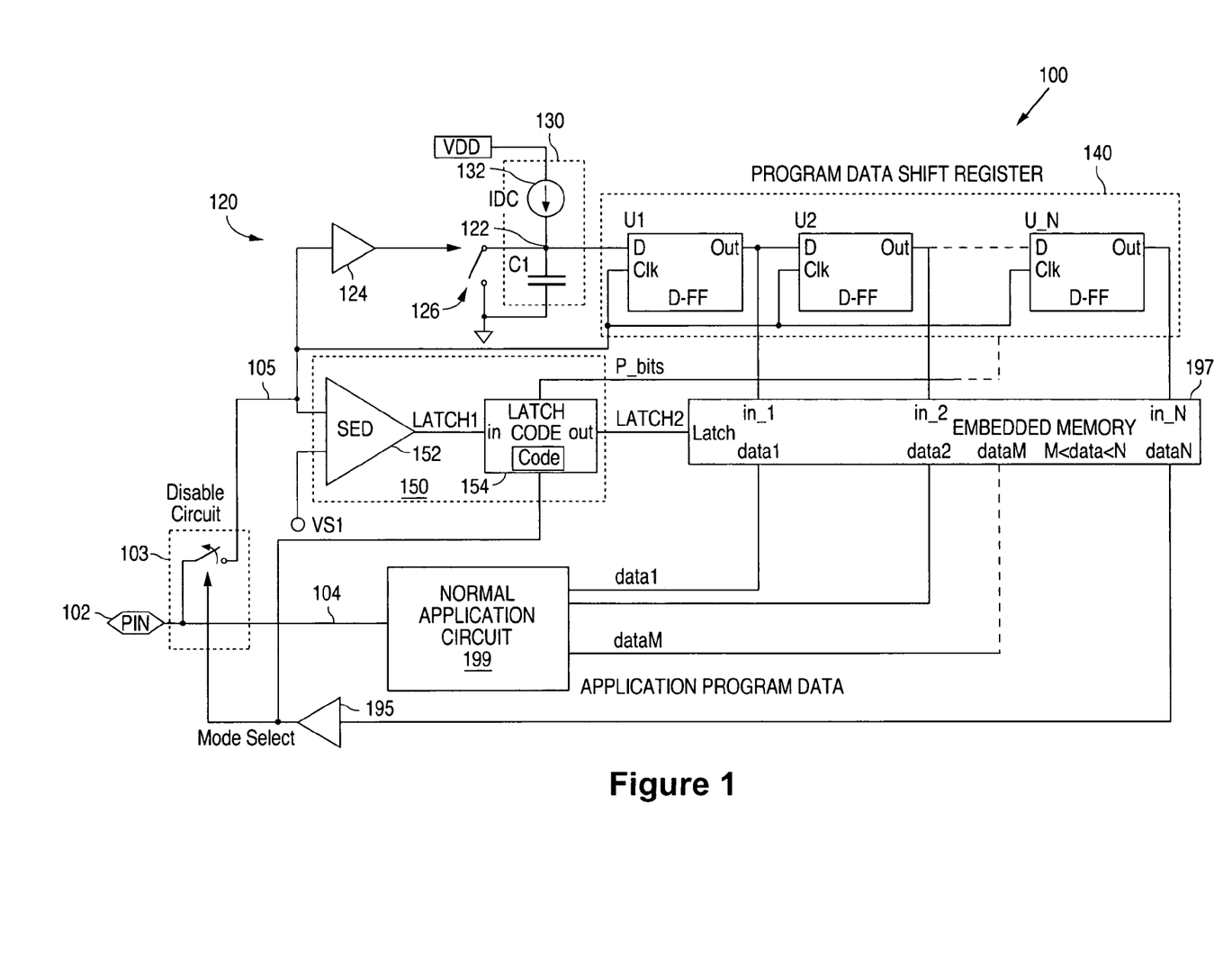
FIG. 1 is a block diagram of a single pin serial data interface circuit implemented on a multi-function pin according to one embodiment of the present invention.

FIG. 1 is a block diagram of a single pin serial data interface circuit implemented on a multi-function pin according to one embodiment of the present invention. Referring to FIG. 1, a pin 102 denotes an input/output pin of an integrated circuit 100 in which the single pin serial data interface circuit of the present invention is incorporated. In the present description, an input/output (I/O) pin refers to a pin or a data terminal on an integrated circuit that functions as an input terminal for receiving incoming data or as an output terminal for transmitting outgoing data or both.

In the present illustration, pin 102 is a multi-function pin and has an application specific function when the integrated circuit is operated in the "normal mode" and a serial data loading function when the integrated circuit is operated in a "serial programming mode." In FIG. 1, normal application circuit 199 denotes the circuitry to which pin 102 is connected in the normal mode. In normal mode operation, normal application circuit 199 either receives data from pin 102 or outputs data to pin 102 or both. However, in many applications, it is desirable to modify the operation or functionality of normal application circuit 199 after manufacturing of the integrated circuit and such modification is usually realized by providing the desired programming data to the normal application circuit. For example, an integrated circuit often requires trimming after the manufacturing process to improve the accuracy of the functions performed by the normal application circuit, such as the accuracy of the temperature or voltage measurements. Trimming is performed by loading and storing desired programming data into the integrated circuit which the programming data is provided to the normal application circuit to modify the operation or functionality of the normal application circuit in a way so as to achieve the desired performance improvement.

The programming data, such as data bits data1 to dataM, are typically stored in an embedded memory 197 of integrated circuit 100. Embedded memory 197 is typically a non-volatile memory, such as an EPROM or Flash memory, but can also be a volatile memory, such as D-flip-flops or a random access memory. Usually, embedded memory 197 is implemented as a non-volatile memory for storing the desired programming data of the memory which data is stored at least until the next programming operation. Embedded memory 197 can be a volatile memory in cases where embedded memory 197 functions to store configuration data for normal application circuit 199. The configuration data are usually used only one-time, such as when the integrated circuit is powered up or is reset, to configure or set up the normal application circuit. When a volatile memory is used to store the configuration data, the configuration data needs to be loaded into the memory each time the integrated circuit is powered up or is reset.

To facilitate the loading of the programming data into integrated circuit 100, a serial data interface is typically used. A serial data interface is preferred over a parallel data interface as it is generally desirable to limit the number of data terminals required to perform the data loading function. In accordance with the present invention, a single pin serial data interface circuit 120 (or serial interface circuit 120) is provided to facilitate the loading of the programming data into embedded memory 197. Serial interface circuit 120 realizes serial data loading without requiring clock synchronization and incorporates a robust data latching scheme. The use of single pin serial interface circuit 120 of the present invention in integrated circuit 100 provides advantages not realized in conventional serial data interface solutions.

In the present illustration, pin 102 is a multi-function pin which is connected to the serial interface circuit only when integrated circuit 100 is in the serial programming mode for serial data loading. In the present embodiment, a disable circuit 103 is included between pin 102 and the input terminals 104, 105 of normal application circuit 199 and serial interface circuit 120 respectively. Disable circuit 103 receives a mode select signal and the main function of disable circuit 103 is to selectively connect pin 102 to serial interface circuit 120 only when serial data loading is being performed. In this manner, disable circuit 103 disconnects pin 102 from the serial interface circuit when serial data loading is not being performed so that inadvertent programming of embedded memory 197 is avoided. Disconnecting pin 102 from the serial interface circuit is also necessary when the embedded memory is a volatile memory which is programmed once upon start up or reset and should not be programmed again.

In one embodiment, the mode select signal is also used to deactivate or power down the serial interface circuit, such as by cutting off the power supply voltage to the serial interface circuit. Thus, when the integrated circuit is in the normal mode, the serial interface circuit is powered off to reduce the power consumption of integrated circuit 100.

In the embodiment shown in FIG. 1, disable circuit 103 is implemented using a single switch connected between pin 102 and input terminal 105 of serial interface circuit 120. Thus, pin 102 is permanently connected to input terminal 104 of normal application circuit 199 and is selectively connected to the serial interface circuit based on the mode select signal. The implementation of disable circuit 103 in FIG. 1 is illustrative only and other circuit implementations for disable circuit 103 can also be used, as is well understood by one of ordinary skill in the art. Essentially, disable circuit 103 operates to connect pin 102 to input terminal 105 of serial interface circuit 120 only when the mode select signal indicates the serial data interface mode of operation. In normal mode operation, disable circuit 103 should operate to disconnect pin 102 from input terminal 105. On the other hand, disable circuit 103 should connect pin 102 to input terminal 104 of normal application circuit 199 when the mode select signal indicates a normal mode of operation. However, pin 102 can remain connected to input terminal 104 even when the mode select signal indicates a serial data interface mode of operation.

Figure 5:
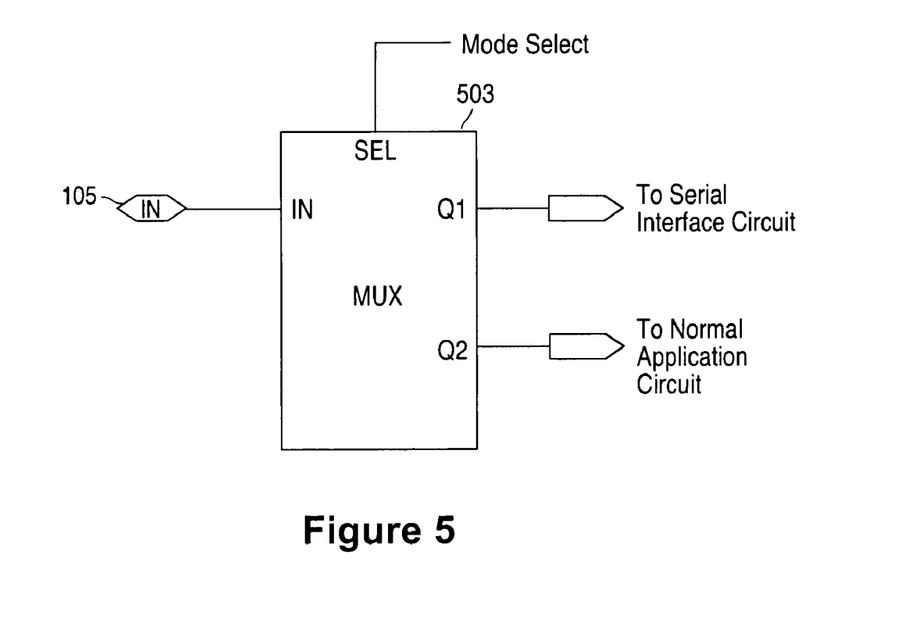
FIG. 5 is a circuit diagram illustrating the implementation of the disable circuit of FIG. 1 according to one embodiment of the present invention.

In an alternate embodiment, disable circuit 103 is implemented using a multiplexer as shown in FIG. 5. Referring to FIG. 5, a multiplexer 503 includes an input terminal IN coupled to pin 102. Multiplexer 503 receives a mode select signal on a select input terminal SEL. Depending on the state of the mode select signal, the input terminal IN is either connected to the first output terminal Q1 or the second output terminal Q2. Thus, when the mode select signal indicates normal mode operation, input terminal IN is connected to output terminal Q2 which is coupled to the normal application circuit. When the mode select signal indicates serial data interface mode operation, input terminal IN is connected to output terminal Q1 which is coupled to the serial interface circuit. In this implementation, pin 102 is selectively connected to either the normal application circuit or the serial interface.

Disable circuit 103 is primarily needed when the serial interface circuit is implemented using a multi-function pin. When a dedicated pin is used as the serial data input terminal, it is generally not necessary to disconnect the pin to the serial interface circuit. However, a disable circuit may still be included even when a dedicated pin is used to avoid reprogramming of volatile memories or to avoid inadvertent programming.

In the present description, disable circuit 103 is said to be engaged when pin 102 is disconnected from the serial interface circuit and disable circuit 103 is said to be disengaged when pin 102 is connected to the serial interface circuit.

The serial data interface communication method of the present invention and the implementation of the serial data interface circuit will now be described with reference to FIGS. 1 and 2. Returning to FIG. 1, serial interface circuit 120 receives digital data on input terminal 105 in the form of data pulses having different pulse separations. Specifically, in accordance with the present invention, the digital data to be serially transmitted on pin 102 is encoded as data pulses having a first pulse separation to represent a first logical data value, such as a logical low ("lo") value, and a second pulse separation to represent a second logical data value, such as a logical high ("hi") value.

In the present description, the term "pulse separation" refers to the time duration between the trailing edge of a first data pulse and the leading edge of a second data pulse following the first data pulse. Thus, the data pulses encoding the digital data can have the same pulse width but each data pulse is spaced apart differently from its preceding data pulse to indicate the different logical data values. Importantly, because the digital data is encoded using relative pulse positions, precision of pulse separation is not required and the serial data interface communication method of the present invention can tolerate variations in the pulse separations while still providing accurate data transfer.

Figure 2A:
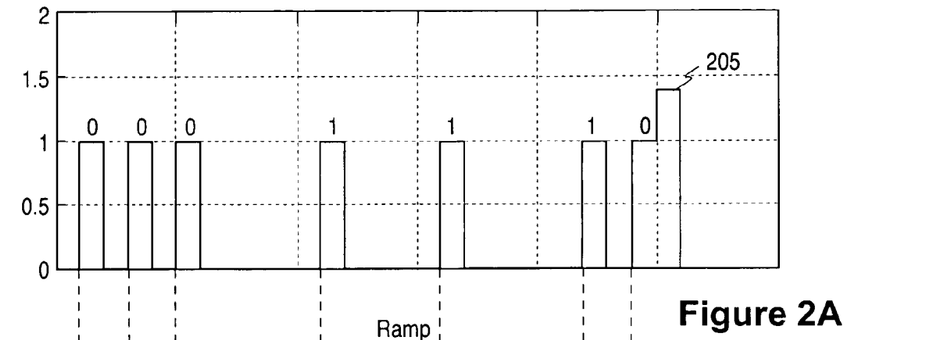
FIGS. 2A, 2B and 2C, is a timing diagram illustrating the operation of the serial interface circuit of FIG. 1.
Figure 2B:
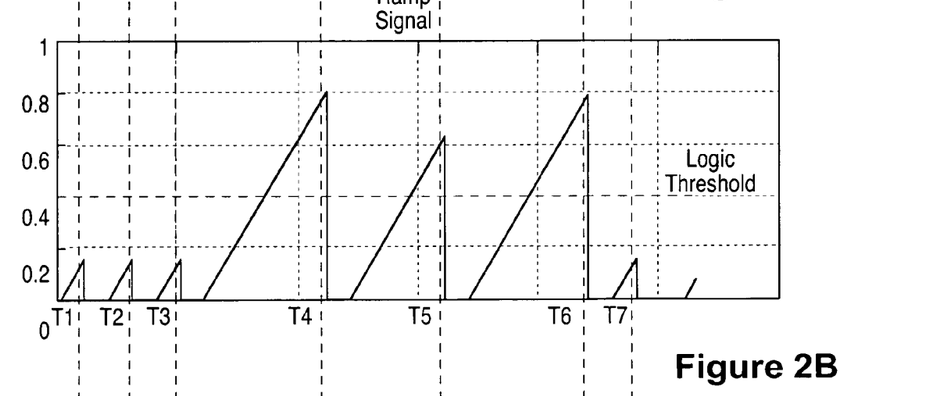
Figure 2C:
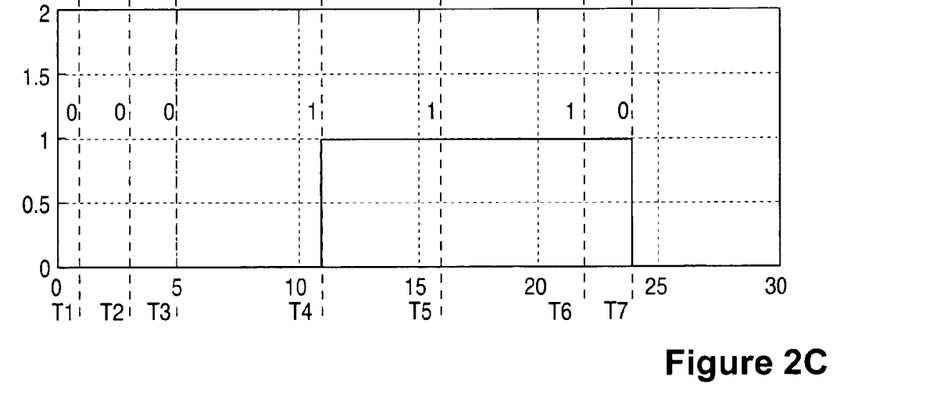

FIG. 2, which includes FIGS. 2A, 2B and 2C, is a timing diagram illustrating the operation of the serial interface circuit of FIG. 1. The timing diagram in FIG. 2A illustrates a series of data pulses encoding a data pattern of "0 0 0 1 1 1 0" being serially transmitted on pin 102 and being provided to input terminal 105 through disable circuit 103. In the present embodiment, a short pulse separation is used to encode a logical "lo" value while a long pulse separation is used to encode a logical "hi" value. Furthermore, in the present embodiment, the leading edge of the data pulses is the rising edge of the data pulses while the trailing edge of the data pulses is the falling edge of the data pulses. The use of a short pulse separation to encode a logical "lo" value and the use of the rising edge as the leading edge of the data pulses are illustrative only. In other embodiments, a short pulse separation may be used to encode a logical "hi" value instead while a long pulse separation may be used to encode a logical "lo" value. Also, the data pulses can be generated so that the falling edge of the data pulses is the leading edge and the rising edge of the data pulses is the trailing edge of the data pulses.

In serial interface circuit 120, the data pulses encoding the desired digital data are serially loaded into a shift register 140. In the present description, a shift register refers to a memory or a series of registers for storing N bits of serial data. A shift register can be implemented using a series of registers or a series of flip-flops. In the present embodiment, shift register 140 is implemented using a series of D-flip-flops (D-FFs) where each Q output terminal drives the next D input terminal of the D-FFs and all clock inputs are driven simultaneously. To store N bits of serial data, D-FFs U1 to UN are used to form shift register 140. In other embodiments, registers or memory units other than a D-FF can also be used. Alternately, a shift register can also be implemented using a random-access memory by using an external counter to generate successive addresses for the random-access memory.

In FIG. 1, shift register 140 includes N D-flip-flops for storing N bits of digital data. The clock terminals of the N D-FFs are all connected to input terminal 105 and therefore all driven by the data pulses. Thus, the D-FFs of shift register 140 "clocks in" or stores the data value present at the D input terminal of the respective flip-flop at the leading edge of each data pulse. In operation, the series of D-FFs loads the data signals present at a data node 122, which is the D input terminal of the first D-FF of the shift register, and the data signals are shifted serially from the first D-FF to the last D-FF at each data pulse. The digital data stored in shift register 140 are provided on an N-bit output terminal to the desired circuit of the integrated circuit. In the present illustration, shift register 140 provides the digital data to embedded memory 197.

Serial interface circuit 120 includes a ramp signal circuit for decoding the input data pulses and generating the data signal indicative of the encoded digital values associated with the data pulses at data node 122. The data pulses received on input terminal 105 are also coupled to the ramp signal circuit. In the present embodiment, the ramp signal circuit includes a delay circuit 124 coupled to receive the input data pulses. Delay circuit 124 operates to introduce a first delay to the leading edge and the trailing edge of each data pulse. In other embodiments, delay circuit 124 can operate to introduce a first delay to just the leading edge of each data pulse while the trailing edge of each data pulse is not delayed. Alternately, delay circuit 124 can operate to introduce a first delay to the leading edge of each data pulse and a second delay to the trailing edge of each data pulse, the first delay being different than the second delay. The exact amount of delay time for the first delay and/or the second delay is not critical to the operation of the serial interface circuit of the present invention. In the present description, the term "delayed data pulses" will be used to refer to data pulses generated by delay circuit 124 which can have just the leading edge of the data pulses delayed, or both the leading edge and the trailing edge of the data pulses delayed, or the leading edge and the trailing edge of the data pulses delayed for different amount of time.

The output terminal of delay circuit 124 is coupled to a switch circuit 126 and the delayed data pulses are used as a control signal for causing the switch circuit to open or close. In the present embodiment, switch circuit 126 is closed on the rising edge of the delayed data pulses and is opened on the falling edge of the delayed data pulses. In the present embodiments, switch circuit 126 is responsive to both the rising and falling edge of the delayed data pulses for opening and closing the switch connection. In other embodiments, switch circuit 126 can be responsive to just the leading edge of the delayed data pulses to close the switch and switch circuit 126 can be caused to open after a predetermined time period. In other words, the control signal to close switch circuit 126 is triggered by the leading edge of the delayed data pulses while the control signal to open switch circuit 126 can be triggered by another timing signal which may or may not be related to the trailing edge of the data pulses or the delayed data pulses.

The ramp signal circuit also includes a charging circuit 130 for generating a ramp signal. The ramp signal is a voltage ramp signal in the present embodiment. In the present embodiment, the charging circuit includes a capacitor C1 having a first plate coupled to data node 122 and a second plate coupled to the Vss supply voltage or the ground voltage. Capacitor C1 is charged by a current source 132 coupled between the Vdd supply voltage and data node 122. In charging circuit 130, capacitor C1 is being continuously charged by current source 132 to generate a voltage ramp signal having increasing voltage magnitude between the Vss supply voltage and the Vdd supply voltage. However, capacitor C1 is periodically discharged through the action of switch circuit 126 which shorts the first plate of capacitor C1 to the Vss supply voltage or the ground voltage. The voltage ramp signal is therefore reset periodically to the Vss voltage and has to be regenerated after the discharge operation is terminated. When the ramp signal is regenerated, the voltage magnitude of the ramp signal increases towards the Vdd voltage.

As a result of the charging and discharging operations, charging circuit 130 generates a saw-tooth like ramp signal where each saw-tooth is associated with a data pulse. The saw-tooth like ramp signal is shown in the timing diagram of FIG. 2B. At the arrival of each data pulse, the voltage value near the peak of each saw-tooth of the ramp signal is read by the shift register as the data signal. If the voltage value of the ramp signal near the peak of a saw-tooth exceeds the logic threshold of the D input terminal of the D-flip-flop, a logical hi data value will be stored. If the voltage value of the ramp signal near the peak of a saw-tooth is less than the logic threshold of the D input terminal of the D-FF, a logical lo data value will be stored. The logic threshold of the D input terminal of the D-FF is illustrated by the dotted line in FIG. 2B. In this illustration the logic threshold of a D-FF is used to discriminate between a logical "lo" and a logical "hi" value of the received data. However more precise voltage value discrimination can be achieved by comparing the sampled ramp voltage with a stable voltage reference using a comparator circuit which could be implemented in a variety of well known methods. In one embodiment, a comparator is coupled to receive the ramp signal and compare the ramp signal to a reference voltage value. The comparator providing an output signal to the D input terminal of the D-FF indicating whether a logical "lo" or a logical "hi" value is detected.

In the present embodiment, serial interface circuit 120 also includes a latching circuit for providing a latch signal which latch signal can be used to instruct the embedded memory of the integrated circuit to latch the data that are loaded in the shift register of the serial interface circuit. For example, if the embedded memory is a flash memory, the latch signal is used to indicate to the flash memory that the data on the output terminals of the shift register should be latched and stored in the flash memory. The latching circuit is optional and is not needed if the embedded memory of the integrated circuit does not require a latch signal for storing the serially loaded data. The latching circuit of the serial interface circuit will be described in more detail below.

The operation of serial interface circuit for serially loading digital data in the form of data pulses into shift register 140 is now described with reference to FIGS. 1 and 2. As described above, FIG. 2A illustrates the transmission of a data pattern "0 0 0 1 1 1 0" encoded as data pulses onto pin 102 and FIG. 2B illustrates the ramp signal generated at data node 122 as a result of the charging circuit operating to decode the incoming data pulses. FIG. 2C illustrates the data signal being stored in the first D-flip-fop of shift register 140, denoted D-FF U1, and therefore illustrates the serial loading of the transmitted data pattern.

To load data into shift register 140, integrated circuit 100 is placed in the serial programming mode and disable circuit 103 is disengaged so that pin 102 is connected to input terminal 105 of serial interface circuit 120. Data pulses encoding digital data "0 0 0 1 1 1 0" arriving on pin 102 are then coupled to input terminal 105 of serial interface circuit 120.

Before the arrival of the leading edge of each data pulse, capacitor C1 in charging circuit 130 is being charged up by current source 132 to generate a ramp signal. Thus, as shown in FIG. 2, starting at time zero and assuming the ramp signal is initially fully discharged, the ramp signal at data node 122 has an increasing voltage magnitude. At time T1, the leading edge of the first data pulse arrives and the first data pulse triggers the clock input terminal of the D-FFs of shift register 140. D-FF U1 of shift register 140 is then caused to load in the data signal that is present at its D input terminal at time T1. Referring to FIG. 2B, because the first data pulse has a short pulse separation to encode a logical "0" value, capacitor C1 does not have that much time to charge up until time T1 and the voltage magnitude of the ramp signal at time T1 is less than the logic threshold (indicated by the dotted line) of D-FF U1 of shift register 140. Thus, D-FF U1 stores a data signal having a logical lo or logical "0" value at time T1, as shown in FIG. 2C.

In serial interface circuit 120, the data pulses are also coupled to delay circuit 124. Thus, after the delay provided by delay circuit 124, the leading edge of the first data pulse arrives at switch circuit 126 causing switch 126 to close. As a result, data node 122 is shorted to the Vss voltage and the ramp signal is reset to 0 volt, as shown in FIG. 2B.

After the reset operation, the ramp signal circuit will regenerate the voltage ramp signal for the next data pulse. In the embodiment shown in FIG. 1, the leading and trailing edges of the data pulses are both being delayed by delay circuit 124 and the ramp signal circuit regenerates the voltage ramp signal on the trailing edge of the delayed data pulses. Thus, at the trailing edge of the delayed first data pulse, switch circuit 126 is open and charging circuit 130 operates again to charge up data node 122. The voltage magnitude of the ramp signal rises again until the arrival of the next data pulse, as shown in FIG. 2. In other embodiments, the ramp signal can be regenerated at any time after the ramp signal has been reset. The time period between the reset and the regenerating operation only needs to be long enough to ensure that capacitor C1 is discharged completely before the capacitor is charged up again.

The second data pulse, also encoding a digital "0" value, is separated from the first data pulse by a short pulse duration. Thus, at time T2, when the leading edge of the second data pulse arrives at the shift register, the voltage magnitude of the ramp signal at data node 122 has not increased that much and a logical "lo" value is again clocked into D-FF U1. A logical "lo" value is stored in D-FF U1 at time T2 as shown in FIG. 2C. The ramp signal is again reset and regenerated. The third data pulse, also encoding a digital "0" value, arrives and a data value of "0" is stored in D-FF U1 at time T3.

The fourth data pulse arriving on input terminal 105 encodes a digital "1" value and is thus separated from the third data pulse by a long pulse duration. Thus, at time T4, when the leading edge of the fourth data pulse arrives at the shift register, the voltage magnitude of the ramp signal at data node 122 has increased beyond the logic threshold and a logical "hi" value is clocked into D-FF U1. A logical "hi" value is then stored in D-FF U1 at time T4 as shown in FIG. 2C. The ramp signal is reset and regenerated at the trailing edge of the delayed fourth data pulse. The next two data pulses also encode a digital "1" value and are therefore separated from the previous data pulse by a long pulse duration. Accordingly, at each of time T5 and T6, a logical "hi" value is stored in D-FF U1.

Then, the last data pulse arrives and has a short pulse separation from the previous data pulse for encoding a digital "0" value. At time T7, a logical "lo" value is stored in D-FF U1. As a result of the charging and discharging operation based on the pulse separation of the data pulses, the data pattern transmitted onto pin 102 is serially loaded into shift register 140. Thus, by encoding digital data into data pulses with long and short pulse separations and by using a charging circuit to generate a ramp signal whose magnitude is determined by the pulse separation, any data pattern can be serially loaded into the shift register.

In FIG. 2A, the last data pulse is shown with a latching pulse 205. The use of a latching pulse in the serial interface circuit of the present invention is optional and the latching pulse is only employed when the integrated circuit in which the serial interface circuit is incorporated requires a latch signal to store the serially loaded data. The use and operation of the latching pulse will be described in more detail below.

In the serial interface circuit of the present invention, since data decoding is determined by a voltage ramp signal below or exceeding a logic threshold, the timing requirements of the encoded data pulses are not critical. A digital "0" value can be encoded by transmitting a data pulse with an arbitrarily short pulse separation from the previous data pulse and a digital "1" value can be encoded by transmitting a data pulse with an arbitrarily long pulse separation from the previous data pulse. The only timing requirement is that the pulse separation for a digital "0" value needs to be less than the time required for the voltage ramp signal to charge up to exceed the logic threshold and the pulse separation for a digital "1" value needs to be longer than the time required for the voltage ramp signal to charge up to exceed that same logic threshold. More generally, the timing requirement is as follows: the pulse separation for a first logical data value only needs to be short enough so that the voltage ramp signal does not charge up to the logic threshold while the pulse separation for a second logical data value needs to be long enough so that the voltage ramp signal charges above the logic threshold.

To operate the serial interface circuit of the present invention, no internal clock source for synchronization purposes is needed, making the implementation of the serial interface circuit cost and space efficient. Furthermore, the selection of the voltage ramp signal and the logic threshold is completely flexible as the behavior of the voltage ramp signal and the value of the logic threshold can be designed by any number of well known methods.

As mentioned above, the serial interface circuit of the present invention can be implemented with or without a latching circuit. When the serially loaded data is used to continually rewrite the content of shift register 140 or the serially loaded data is used by a volatile memory of the integrated circuit as configuration data, the latching circuit is not required as the integrated circuit does not require a latch signal to store the serially loaded data. On the other hand, a latching circuit is required when the serially loaded data is to be stored in a non-volatile memory of the integrated circuit, such as a FLASH memory or a battery backed RAM, and a latch signal is needed to indicate when the data in the shift-register should be stored in the non-volatile memory.

In the embodiment shown in FIG. 1, a latching circuit 150 is included to provide a latch signal to embedded memory 197. In accordance with the present invention, the data pulses transmitted on pin 102 include a latching pulse 205 appended at the last one of the data pulses for use to indicate the end of the data sequence and the initiation of the latching operation, as shown in FIG. 2A. Latching pulse is a data pulse having a voltage magnitude exceeding the normal operating range of pin 102. For instance, the normal operating range of pin 102 is between the Vss voltage and the Vdd voltage. Then, latching pulse 205 can have a voltage magnitude below the Vss voltage or above the Vdd voltage. In the present embodiment, the latching pulse is a pulse having a voltage exceeding the Vdd voltage (FIG. 2A).

In the embodiment of serial interface circuit 120 of FIG. 1, latching circuit 150 includes a supply exceed detector 152 and an optional latch code circuit 154. Supply exceed detector 152 is coupled to input terminal 105 to receive the incoming data pulses and is also coupled to receive a voltage VS1. Voltage VS1 is one of the two supply voltages of integrated circuit 100. That is, voltage VS1 can be the Vss voltage or the Vdd voltage depending on the implementation of the latching pulse. In the present embodiment, the latching pulse is a pulse which exceeds the Vdd voltage of the integrated circuit. Thus, in the present embodiment, voltage VS1 is the Vdd voltage of the integrated circuit. Supply exceed detector 152 monitors the incoming data pulses and when a data pulse with a voltage magnitude exceeding the Vdd voltage is detected, supply exceed detector 152 will assert its output terminal to provide a latch signal, denoted LATCH1 in the present embodiment.

Figure 3A:
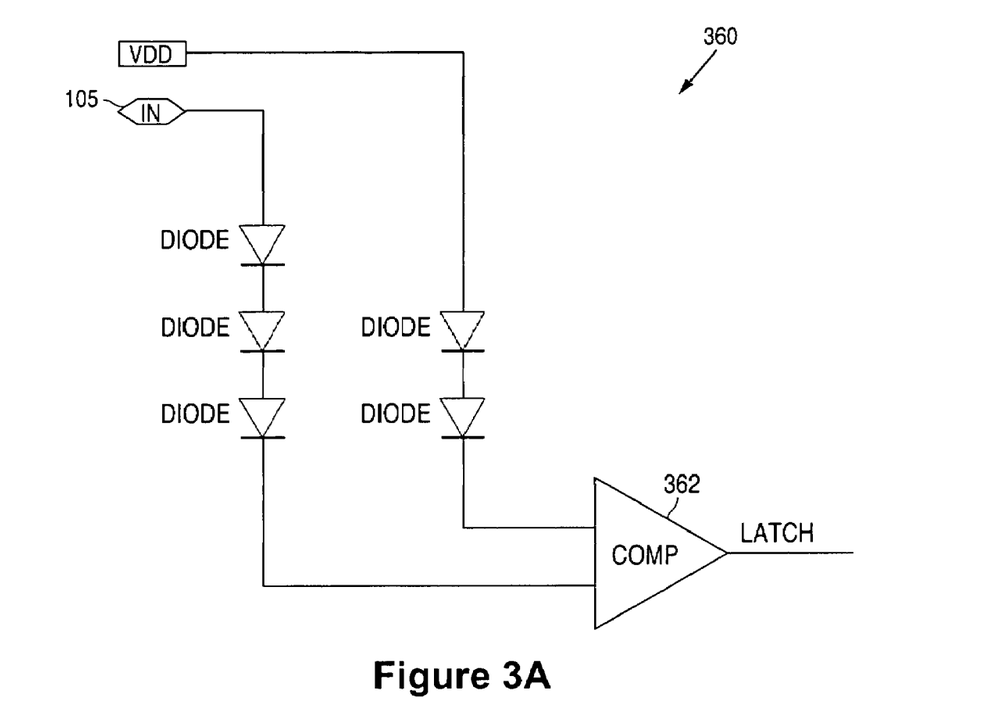
FIGS. 3A and 3B are circuit diagrams illustrating two implementations of the supply exceed detector for positive supply detection according to alternate embodiments of the present invention.
Figure 3B:
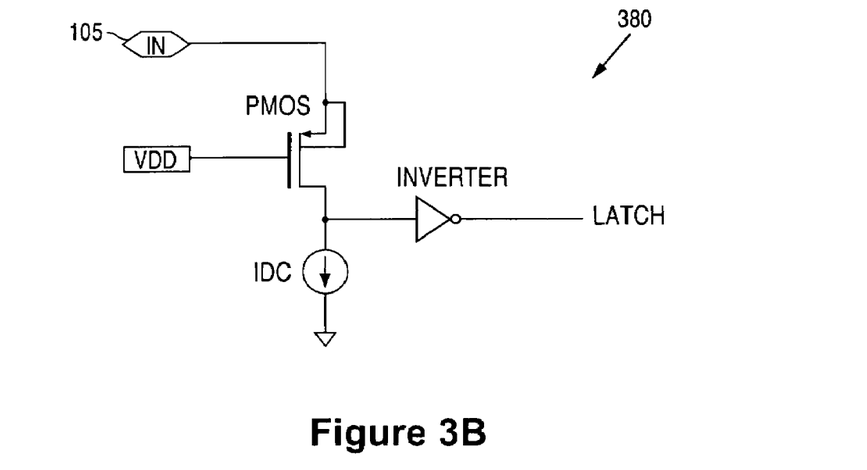

The supply exceed detector in the latching circuit of the present invention can be implemented in a variety of ways and can operate by detecting a positive data pulse voltage exceeding the VDD supply voltage by a predetermined amount or a negative data pulse voltage less than the Vss or ground voltage by a predetermined amount, assuming that necessary layout precautions are taken into consideration to avoid potential deleterious effects such as CMOS latchup from occurring. FIGS. 3A and 3B are circuit diagrams illustrating two implementations of the supply exceed detector for positive supply detection.

Referring to FIG. 3A, supply exceed detector 360 includes a comparator 362 comparing two input voltage values. The first input voltage is the Vdd voltage coupled through two serially connected diodes. The Vdd voltage is therefore decreased by two diode voltage drop at the first input terminal of comparator 362. The second input voltage is the data pulse voltage coupled through three serially connected diodes. Thus, the data pulse voltage is decreased by three diode voltage drop at the second input terminal of comparator 362. If the data pulse voltage exceeds the Vdd voltage by more than one diode drop, the output signal LATCH1 of comparator 362 will be asserted. Otherwise, the output signal LATCH1 will remain deasserted.

Referring to FIG. 3B, supply exceed detector 380 includes a PMOS transistor having its gate terminal coupled to the Vdd voltage, its drain terminal coupled to a current source providing a current IDC and a source terminal coupled to receive the data pulse voltage. An inverter is coupled to the drain terminal of the PMOS transistor. If the data pulse voltage does not exceed the Vdd voltage by the threshold voltage of the PMOS transistor, the PMOS transistor will be turned off and the voltage at the drain terminal is near the Vss voltage and the LATCH1 signal is not asserted. If the data pulse voltage exceeds the Vdd voltage by the threshold voltage of the PMOS transistor, the PMOS transistor will be turned on and the voltage at the drain terminal is pulled up, tripping the inverter output voltage and thereby asserting the LATCH1 signal.

Figure 4:
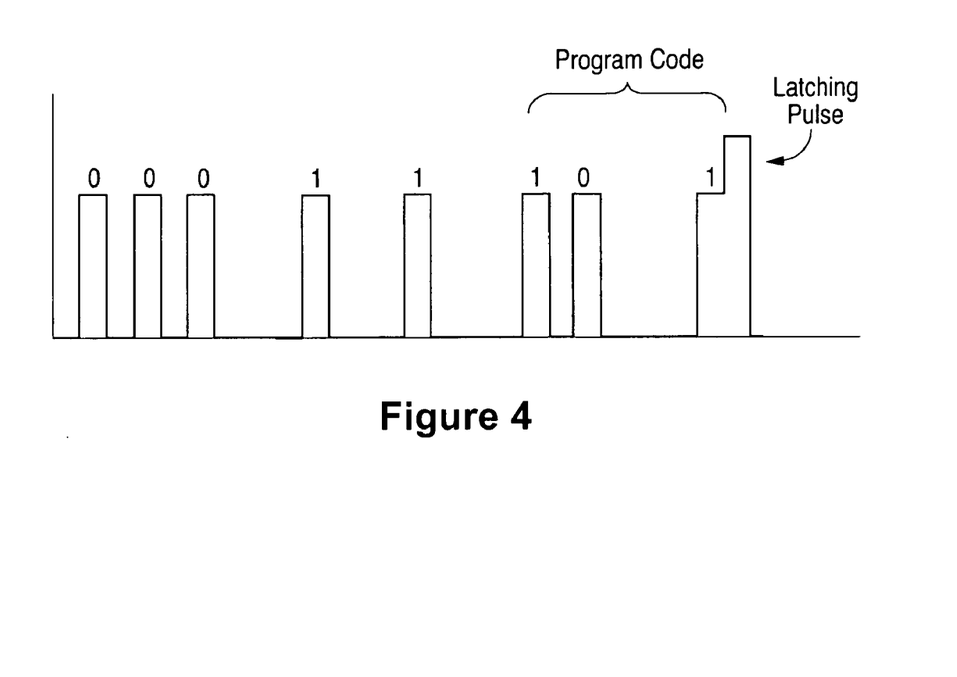
FIG. 4 illustrates the transmission of a data pattern where the last three bits of the digital data contains the required program code.

In accordance with the present invention, the LATCH1 signal can be used by embedded memory 197 directly to initiate the latching of data stored in shift register 140. However, in the present embodiment, enhanced latching security is provided by using latch code circuit 154. Specifically, the serial interface circuit of the present invention implements a robust latching mechanism by using a data pulse having a voltage magnitude exceeding the normal operating range of the integrated circuit to indicate latching of the serially loaded data. Because it is unlikely that the voltage magnitude on a pin would exceeds the normal operating range of the integrated circuit during normal operation, inadvertent latching of digital data is avoided. However, in one embodiment of the present invention, the serial interface circuit provides further enhanced latching security by requiring the transmission of a specific program code before the latch signal can be asserted. For example, FIG. 4 illustrates the transmission of a data pattern where the last three bits of the digital data contains the required program code "1 0 1". Transmitting a data pattern of "0 0 0 1 1 1 0 1" will result in the latching of data "0 0 0 1 1" into the embedded memory of the integrated circuit where data "1 0 1" is stored by the shift register as the program code.

In the embodiment shown in FIG. 1, latching circuit 150 includes latch code circuit 154 storing the requisite program code. Latch code circuit 154 is coupled to receive P_bits of data stored in shift register 140 for comparison with the stored program code. In the present illustration, the P_bits of data are the most significant three bits of data stored in shift register 140. Latch code circuit 154 also receives the LATCH1 signal from supply exceed detector 152. If the P_bits of data stored in shift register 140 match the program code stored in latch code circuit 154, latch code circuit 154 will allow that LATCH1 signal to pass through. That is, the latch code circuit will assert its output signal, denoted LATCH2, if the LATCH1 signal is also asserted. If the P_bits of data stored in shift register 140 do not match the program code stored in latch code circuit 154, latch code circuit 154 will not allow that LATCH1 signal to pass through. That is, the LATCH2 will not be asserted even if the LATCH1 signal is asserted.

In the present embodiment, when the LATCH2 signal is asserted, the embedded memory will latch in the data stored in shift register 140 except for the P bits containing the program code. In an alternate embodiment, part of the P bits of digital data is also being used as a memory status code for indicating that the embedded memory has been programmed. In that case, when the LATCH2 signal is asserted, the embedded memory will latch in the data stored in shift register other than the part of the P bits not used as the memory status code. For example, for the N-bit digital data, the embedded memory will either latch in N-P bits of data or N-P+K bits of data where K is the number of bits in the program code used for the memory status code.

Thus, in the embodiment shown in FIG. 1, latching circuit 150 will provide a latch signal to embedded memory 197 only when two conditions are met: (1) a data pulse exceeding the normal operating range is detected and (2) the serial data loaded into the shift register contains the requisite program code. In this manner, noise spikes on the input data pulses will not trigger erroneous latching of data in the shift register. The program code can be of arbitrarily long bit length to achieve the desired security level. Latch code circuit 154 can be implemented as a logic circuit and many implementations well known to one skilled in the art are possible.

Note that in the embodiment shown in FIG. 1, the requisite program code for allowing the latching of the serially loaded data is prestored in latch circuit 154. For example, the program code can be stored in registers in the latch code circuit or can be hardwired in the latch code circuit. Prestoring the program code in the latch code circuit is illustrative only and in other embodiments, the program code can be provided to the latch code circuit using other means. In an alternate embodiment, the program code is provided to latch code circuit 154 from an external circuit. In yet another alternate embodiment, the program code is stored in embedded memory 197 and is provided to latch code circuit 154 from the embedded memory.

In the present embodiment, because pin 102 is a multi-function pin, once the data has been latched into the embedded memory, it is desirable to disable the serial interface circuit to avoid inadvertent loading of data into the embedded memory. In the present embodiment, one bit of the embedded memory is used to indicate that the embedded memory has been programmed and that the serial interface circuit should be disabled. Specifically, bit N of embedded memory 197, coupled through a delay circuit 195, is used as the mode select signal for disable circuit 103. When bit N is asserted, disable circuit 103 will be engaged after the delay provided by delay circuit 195, opening the connection between the input terminal 105 of the serial interface circuit and pin 102. Pin 102 can then resume its normal application function. When disable circuit 103 is implemented as a multiplexer as in FIG. 5, the mode select signal causes pin 102 to be connected to output terminal Q2 instead of output terminal Q1, thereby enabling the normal application function and disabling the serial interface function. Disconnecting the serial interface circuit from pin 102 has the additional advantage of minimizing the loading on the pin during normal application function. Furthermore, the mode select signal can also be coupled to completely power down the serial interface circuit so that there is no additional power consumed by the serial interface circuit during normal circuit operation.

Alternatively, protection against inadvertent latching can also be implemented in the serial interface circuit itself with or without disconnecting input terminal 105 from pin 102. In the embodiment shown in FIG. 1, the bit of the embedded memory used to indicate that the embedded memory has been programmed can also be used to disable the latch code circuit. More specifically, in FIG. 1, bit N of embedded memory 197 is coupled through delay circuit 195 to be used as the mode select signal for disable circuit 103. The mode select signal can also be coupled to latch code circuit 154 to disable the latch code circuit once the mode select signal is asserted to place the integrated circuit in the normal application mode. In this manner, should the data pattern subsequently present on pin 102 intended for the normal application circuit happens to contain the program code, the latch code circuit is still prevented from latching the serially loaded data since the embedded memory has disabled the latch code circuit.

According to an alternate embodiment of the present invention, the serial interface circuit of FIG. 1 can also be configured for erasing the content of the embedded memory as well as loading data into the embedded memory. In one embodiment, latch code circuit 154 stores a second program code used to indicate erasing of the embedded memory. Thus, when erasure of the embedded memory is desired, serial interface circuit 120 can be used to load in the second program code and a latching pulse can then be provided to initiate erasing. In operation, when the P_bits of shift register 140 matches the second program code and when a latching pulse is detected by the supply exceed detector, the latch code circuit will issue an erase signal (not shown in FIG. 1) to embedded memory 197 which erase signal will instruct the appropriate erase circuitry of the embedded memory to perform the erase operation.

As described above, in FIG. 1, the serial interface circuit includes delay circuit 124 coupled to delay both the leading edge and the trailing edge of the incoming data pulses. The use of a non-inverting buffer as delay circuit 124 in FIG. 1 is illustrative only. The delay circuit can be implemented using various circuit means to provide the desired delay to the desired edges of the data pulses. For the purpose of resetting the ramp signal, only the leading edge of the data pulses needs to be delayed. In one embodiment, delay circuit 124 operates to delay only the leading edge of the data pulses. In this configuration, the regeneration of the voltage ramp signal is initiated a given time period after the delayed leading edge and does not have to be related to the trailing edge of the data pulses. Indeed, the regeneration can start as soon as the ramp signal is reset by the delayed leading edge of the data pulses provided the voltage magnitude of the ramp has been sampled and decoded as a received logic "lo" or "hi". In other embodiments, the regeneration of the voltage ramp signal can start at the delayed leading edge, the trailing edge or at the delayed trailing edge of the data pulses.

Furthermore, in the embodiment shown in FIG. 1, charging circuit 130 is used to provide a positive or increasing magnitude voltage ramp signal between the Vss supply voltage and the Vdd supply voltage. Charging circuit 130 of FIG. 1 is illustrative only and the charging circuit can be implemented in other fashions to provide the desired voltage ramp signal which can be reset and regenerated as described above. In general, a charging circuit suitable for use in the serial data interface circuit of the present invention should generate a voltage ramp signal between a first voltage and a second voltage, the first voltage and the second voltage not necessarily the supply voltages of the integrated circuit. The charging circuit should reset the voltage ramp signal to the first voltage at the leading edge of the delayed data pulses and should allow the voltage ramp signal to regenerate towards the second voltage a first time period afterwards, which first time period can be "zero" time period. That is, the voltage ramp signal can be regenerated immediately after the voltage ramp signal is reset.

In other embodiments, the charging circuit can provide a negative voltage ramp or a decreasing magnitude voltage ramp. Thus, the voltage ramp signal will be initially at the first voltage (such as the Vdd voltage) and is discharged towards the second voltage (such as the Vss voltage) to generate an inverse saw-toothed signal. The arrival of each data pulse causes the voltage ramp signal to be reset back to the first voltage. In this configuration, a voltage ramp signal having a magnitude greater than the logic threshold at the arrival of a data pulse can be used to represent a short pulse separation data value while a voltage ramp signal having a certain magnitude less than the logic threshold at the arrival of a data pulse can be used to represent a long pulse separation data value.

The above detailed descriptions are provided to illustrate specific embodiments of the present invention and are not intended to be limiting. Numerous modifications and variations within the scope of the present invention are possible. The present invention is defined by the appended claims.

I claim:

1. A data communication method for receiving digital data on a data terminal, comprising:
    receiving data pulses indicative of the digital data to be transmitted at the data terminal, the data pulses having a first pulse separation to represent a first logical data value and a second pulse separation to represent a second logical data value;
    generating a voltage ramp signal having a voltage magnitude between a first voltage and a second voltage;
    resetting the voltage ramp signal to the first voltage at a first delay after the leading edge of each data pulse;
    regenerating the voltage ramp signal towards the second voltage at a first time period after the resetting of the voltage ramp signal;
    detecting a voltage value of the voltage ramp signal at the leading edge of each data pulse;
    generating a data output signal associated with each data pulse having a first logical state when the voltage value of the voltage ramp signal is less than a threshold value;
    generating a data output signal associated with each data pulse having a second logical state when the voltage value of the voltage ramp signal is greater than the threshold value; and
    storing the data output signal associated with each data pulse in a shift register.

2. The data communication method of claim 1, wherein each of the first and second pulse separation comprises a time duration between the trailing edge of a first data pulse and the leading edge of a second data pulse following the first data pulse, and wherein the first pulse separation is shorter than the second pulse separation.

3. The data communication method of claim 1, wherein the threshold value comprises the logic threshold of the input terminal of the shift register.

4. The data communication method of claim 1, wherein the threshold value comprises a reference voltage value and wherein generating a data output signal associated with each data pulse having a first logical state and generating a data output signal associated with each data pulse having a second logical state comprise:
    comparing the voltage ramp signal to the reference voltage value;
    generating a data output signal associated with each data pulse having the first logical state when the voltage value of the voltage ramp signal is less than the reference voltage value; and
    generating a data output signal associated with each data pulse having the second logical state when the voltage value of the voltage ramp signal is greater than the reference voltage value.

5. The data communication method of claim 1, further comprising:
    at the last data pulse, generating a latching pulse appended to the last data pulse, the latching pulse having a voltage magnitude beyond a normal voltage range of the data pulses;
    receiving the latching pulses at the data terminal; and
    generating a latch signal in response to the latching pulse, the latch signal causing the data output signals associated with the data pulses to be stored in a memory circuit.

6. The data communication method of claim 5, wherein generating a latching pulse appended to the last data pulse comprises generating the latching pulse having a voltage magnitude greater than the Vdd voltage of the data pulses wherein the Vdd voltage is a power supply voltage.

7. The data communication method of claim 5, wherein generating a latching pulse appended to the last data pulse comprises generating the latching pulse having a voltage magnitude less than the Vss voltage of the data pulses wherein the Vss voltage is a ground voltage.

8. The data communication method of claim 1, further comprising:
    at the last data pulse, generating a latching pulse appended to the last data pulse, the latching pulse having a voltage magnitude beyond a normal voltage range of the data pulses;
    receiving the latching pulses at the data terminal;

when a first portion of the data output signals associated with the data pulses corresponds to a first program code, generating a latch signal in response to the latching pulse, the latch signal causing a second portion of the data output signals associated with the data pulses to be stored in a memory circuit.

9. The data communication method of claim 8 wherein the digital data to be transmitted at the data terminal comprises N bits of digital data encoded in N data pulses, the first portion of the data output signals comprising P bits of the digital data and the second portion of the data output signals comprising at least N-P bits of the digital data.

10. The data communication method of claim 1, further comprising:
at the last data pulse, generating a latching pulse appended to the last data pulse, the latching pulse having a voltage magnitude beyond a normal voltage range of the data pulses;
receiving the latching pulses at the data terminal;
when the data output signals associated with the data pulses correspond to a first program code, generating a latch signal in response to the latching pulses; and
erasing data stored in a memory circuit in response to the latch signal.

11. The data communication method of claim 1, wherein:
generating a voltage ramp signal comprises charging a capacitor to the first voltage;
resetting the voltage ramp signal at a given delay after the leading edge of each data pulse comprises shorting the capacitor to the second voltage; and
detecting the voltage value of the voltage ramp signal at the leading edge of each data pulse comprises measuring the voltage value of the capacitor at the leading edge of each data pulse.

12. The data communication method of claim 1, wherein:
generating a voltage ramp signal comprises discharging a capacitor to the first voltage;
resetting the voltage ramp signal at a given delay after the leading edge of each data pulse comprises shorting the capacitor to the second voltage; and
detecting the voltage value of the voltage ramp signal at the leading edge of each data pulse comprises measuring the voltage value of the capacitor at the leading edge of each data pulse.

13. The data communication method of claim 1, wherein regenerating the voltage ramp signal towards the second voltage at a first time period after the resetting of the voltage ramp signal comprises:
regenerating the voltage ramp signal towards the second voltage at the trailing edge of each data pulse or at a second delay after the trailing edge of each data pulse.

14. The data communication method of claim 1, wherein regenerating the voltage ramp signal towards the second voltage at a first time period after the resetting of the voltage ramp signal comprises:
regenerating the voltage ramp signal towards the second voltage after the resetting of the voltage ramp signal, the first time period comprising being of zero time duration.

15. The data communication method of claim 13, wherein the leading edge of the data pulses comprises the rising edge of the data pulses and the trailing edge of the data pulses comprises the falling edge of the data pulses.

16. A data communication method for transmitting and receiving serial digital data over a single communication line:
encoding data to be transmitted as data pulses, the data pulses having a first pulse separation to represent a first logical data value and a second pulse separation to represent a second logical data value;
transmitting the data pulses on a single communication wire;
receiving the data pulses at a data terminal;
generating a voltage ramp signal having a voltage magnitude between a first voltage and a second voltage;
resetting the voltage ramp signal to the first voltage at a first delay after the leading edge of each data pulse;
regenerating the voltage ramp signal towards the second voltage at a first time period after the resetting of the voltage ramp signal;
detecting the voltage value of the voltage ramp signal at the leading edge of each data pulse;
generating a data output signal associated with each data pulse having a first logical state when the voltage value of the voltage ramp signal is less than a threshold value;
generating a data output signal associated with each data pulse having a second logical state when the voltage value of the voltage ramp signal is greater than the threshold value; and
storing the data output signal associated with each data pulse in a shift register.

17. An integrated circuit, comprising:
a data terminal, the data terminal to be coupled to a single data wire for receiving digital data transmitted on the single data wire; and
a serial data interface circuit comprising:
a first terminal coupled to the data terminal for receiving the digital data, the digital data being encoded as data pulses having a first pulse separation to represent a first logical data value and a second pulse separation to represent a second logical data value;
a delay circuit comprising an input terminal coupled to the data terminal for receiving the data pulses and an output terminal providing an output signal, the delay circuit introducing a first delay to at least the leading edge of each data pulse and providing delayed data pulses as the output signal at the output terminal;
a ramp signal circuit comprising a control input terminal coupled to receive the output signal of the delay circuit and an output terminal providing a voltage ramp signal having a voltage magnitude between a first voltage and a second voltage, the voltage ramp signal being reset to the first voltage at the leading edge of each delayed data pulse and being regenerated towards the second voltage at a first time period after the leading edge of each delayed data pulse; and
an N-bit shift register having a clock input terminal coupled to the first terminal receiving the data pulses, a data input terminal coupled to the output terminal of the ramp signal circuit for receiving the voltage ramp signal and an N-bit data output terminal providing the N-bit digital data stored therein in parallel data bits,
wherein for each data pulse, the shift register stores a data signal indicative of the magnitude of the voltage ramp signal at the leading edge of each data pulse, the data signal having a first logical state when the voltage value of the voltage ramp signal is less than a threshold value and the data signal having a second logical state when the voltage value of the voltage ramp signal is greater than the threshold value.

18. The integrated circuit of claim 17, wherein the pulse separation comprises the time duration between the trailing edge of a first data pulse and the leading edge of a second data pulse following the first data pulse, and wherein the first pulse separation is shorter than the second pulse separation.

19. The integrated circuit of claim 17, wherein the voltage ramp signal is regenerated at the trailing edge of each data pulse.

20. The integrated circuit of claim 17, wherein the delay circuit introduces the first delay to the leading edge and the trailing edge of each data pulse and the voltage ramp signal is regenerated at the trailing edge of each delayed data pulse.

21. The integrated circuit of claim 17, wherein the first time period for regenerating the voltage ramp signal comprises zero time period.

22. The integrated circuit of claim 17, wherein the leading edge of the data pulses comprises the rising edge of the data pulses and the trailing edge of the data pulses comprises the falling edge of the data pulses.

23. The integrated circuit of claim 17, wherein the threshold value comprises the logic threshold of the input terminal of the shift register.

24. The integrated circuit of claim 17, wherein the threshold value comprises a reference voltage value and the integrated circuit further comprises a comparator circuit having a first input terminal coupled to the output terminal of the ramp signal circuit and a second input terminal coupled to receive the reference voltage value and an output terminal coupled to the data input terminal of the shift register.

25. The integrated circuit of claim 17, wherein the ramp signal circuit comprises:
   a capacitor having a first plate coupled to a first node and a second plate coupled to the first voltage;
   a current source coupled to the first plate of the capacitor for providing a source of current to charge the capacitor; and
   a switch circuit coupled between the first node and the first voltage, the switch circuit being controlled by the leading edge of the delayed data pulses,
   wherein at the leading edge of the delayed data pulses, the switch circuit is closed to short the first plate of the capacitor to the first voltage and after the first time period after the leading edge of the delayed data pulses, the switch circuit is open and the capacitor is charged by the current from the current source towards the second voltage.

26. The integrated circuit of claim 25, wherein the first voltage comprises a Vss voltage and the capacitor is being charged up by the current source to the second voltage being a Vdd voltage, wherein the Vss voltage is a ground voltage and the Vdd is a power supply voltage.

27. The integrated circuit of claim 25, wherein the first voltage comprises the Vdd voltage and the capacitor is being discharged by the current source to the second voltage being a Vss voltage, wherein Vdd voltage is a power supply voltage and the Vss voltage is a ground voltage.

28. The integrated circuit of claim 17, further comprising:
   a latching circuit having a first input terminal coupled to the first terminal for receiving the data pulses, a second input terminal coupled to receive a first supply voltage of the integrated circuit and an output terminal providing a latch signal,
   wherein the data pulses received at the data terminal comprise a latching pulse appended to the last one of the data pulses, the latching pulse having a voltage magnitude exceeding the first supply voltage; and
   wherein the latching circuit asserts the latch signal when the latching circuit detects a data pulse having a voltage magnitude exceeding the first supply voltage, the latch signal causing the N-bit data signals stored in the shift register to be latched in a memory circuit of the integrated circuit.

29. The integrated circuit of claim 28, wherein the first supply voltage comprises a Vdd voltage and the latching pulse has a voltage magnitude greater than the first supply voltage wherein the Vdd voltage is a power supply voltage.

30. The integrated circuit of claim 28, wherein the first supply voltage comprises a Vss voltage and the latching pulse has a voltage magnitude less than the first supply voltage wherein the Vss voltage is a ground voltage.

31. The integrated circuit of claim 28, wherein the latching circuit comprises a supply exceed detector, the supply exceed detector comprising:
   a first set of M serially connected diodes coupled to receive the first supply voltage and providing a first output voltage having a voltage magnitude M diode voltage drop less than the first supply voltage;
   a second set of P serially connected diodes, P being greater than M, coupled to receive the data pulses and providing a second output voltage having a voltage magnitude P diode voltage drop less than the voltage magnitude of the data pulses; and
   a comparator coupled to compare the first output voltage and the second output voltage, the comparator asserting the latch signal when the second output voltage is greater than the first output voltage.

32. The integrated circuit of claim 28, wherein the latching circuit comprises a supply exceed detector, the supply exceed detector comprising:
   a PMOS transistor having a control terminal coupled to the first supply voltage, a first current handling terminal coupled to a current source and a second current handling terminal coupled to receive the data pulses; and
   an inverter having an input terminal coupled to the first current handling terminal of the PMOS transistor and an output terminal providing the latch signal,
   wherein the inverter asserting the latch signal when the voltage magnitude of the data pulses is a transistor threshold voltage greater than the first supply voltage.

33. The integrated circuit of claim 17, further comprising:
   a latching circuit having a first input terminal coupled to the first terminal for receiving the data pulses, a second input terminal coupled to receive a first supply voltage of the integrated circuit, a third input terminal coupled to the output terminal of the shift register and an output terminal providing a latch signal,
   wherein the data pulses received at the data terminal comprise a latching pulse appended to the last one of the data pulses, the latching pulse having a voltage magnitude exceeding the first supply voltage; and
   wherein the latching circuit asserts the latch signal when the latching circuit detects a data pulse having a voltage magnitude exceeding the first supply voltage and when a first portion of the N-bit data signal stored in the shift register corresponds to a first program code, the latch signal causing a second portion of the N-bit data signal stored in the shift register to be latched in a memory circuit of the integrated circuit.

34. The integrated circuit of 33, wherein the first portion of the data output signals comprises P bits of the N-bit digital data and the second portion of the data output signals comprising at least N-P bits of the N-bit digital data.

35. The integrated circuit of 33, wherein the first program code is stored in the latching circuit.

36. The integrated circuit of 33, wherein the first program code is stored in the memory circuit of the integrated circuit and is provided to the latching circuit by the memory circuit.

37. The integrated circuit of claim 17, further comprising:

a latching circuit having a first input terminal coupled to the first terminal for receiving the data pulses, a second input terminal coupled to receive a first supply voltage of the integrated circuit and an output terminal providing a latch signal, wherein the data pulses received at the data terminal comprise a latching pulse appended to the last one of the data pulses, the latching pulse having a voltage magnitude exceeding the first supply voltage; and wherein the latching circuit asserts the latch signal when the latching circuit detects a data pulse having a voltage magnitude exceeding the first supply voltage and when a portion of the N-bit data signal stored in the shift register corresponds to a first program code, the latch signal causing data stored in a memory circuit of the integrated circuit to be erased.

38. The integrated circuit of claim 17, wherein the data terminal is a multi-function data terminal and the integrated circuit further comprises:

an application-specific circuit coupled to the data terminal, the application-specific circuit receiving digital data from or transmitting digital data onto the data terminal.

39. The integrated circuit of claim 38, further comprising:

a disable circuit coupled between the data terminal and the first terminal of the serial data interface circuit, the disable circuit being controlled by a mode select signal, wherein the disable circuit is disengaged to connect the first terminal of the serial data interface circuit to the data terminal when the mode select signal has a first state for activating the serial data interface circuit.

40. The integrated circuit of claim 39, wherein the disable circuit comprises a multiplexer having an input terminal coupled to the data terminal, a first output terminal coupled to the first terminal of the serial data interface circuit, a second output terminal coupled to the application-specific circuit, and a select input terminal coupled to receive the mode select signal, wherein the multiplexer connects the input terminal to the first output terminal when the mode select signal has a first state for activating the serial data interface circuit and the multiplexer connects the input terminal to the second output terminal when the mode select signal has a second state for deactivating the serial data interface circuit.

41. The integrated circuit of claim 17, wherein the N-bit shift register comprises a series of N D-flip-flops, the clock terminals of each D-flip-flop being coupled to the first terminal, the data input terminal of each D-flip-flop being coupled to the data output terminal of the prior D-flip-flop, the data input terminal of the first one of the D-flip-flop being coupled to the output terminal of the ramp signal circuit.

* * * * *

UNITED STATES PATENT AND TRADEMARK OFFICE
CERTIFICATE OF CORRECTION

PATENT NO. : 7,315,585 B2  Page 1 of 1
APPLICATION NO. : 10/776154
DATED : January 1, 2008
INVENTOR(S) : Christian Gater It is certified that error appears in the above-identified patent and that said Letters Patent is hereby corrected as shown below:

Column 17, line 59, claim 14: Cancel "comprising" and add no substitute.

Signed and Sealed this

Twenty-sixth Day of May, 2009

JOHN DOLL
*Acting Director of the United States Patent and Trademark Office*